BALLENTINE & CLARK.
Meal Drier.
No. 1,093.
Patented March 4, 1839.
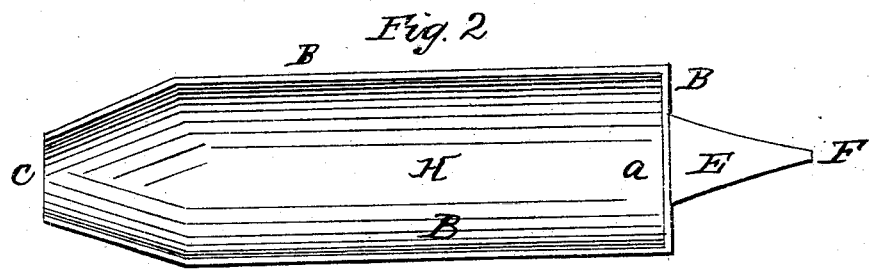
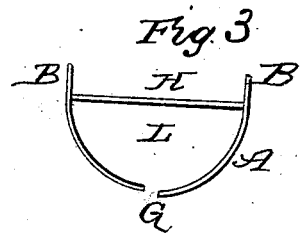

UNITED STATES PATENT OFFICE.

JOHN BALLANTINE AND ADAM CLARK, OF ZANESVILLE, OHIO.

APPARATUS FOR DRYING FLOUR AND OTHER FINELY-DIVIDED SUBSTANCES.

Specification of Letters Patent No. 1,093, dated March 4, 1839.

*To all whom it may concern:*

Be it known that we, JOHN BALLANTINE and ADAM CLARK, of Zanesville, in the county of Muskingum and State of Ohio, have invented a new and useful Machine for Drying Flour and other Finely - Divided Substances; and we do hereby declare that the following is a true and exact description.

The nature of our invention consists in the use of a cylindrical segment, closed by caps at each end, except a passage for steam, and by a plane, covering the chord of the segment, used for the drying of flour and other finely divided substances, the drying agent being applied under the plane, along which the flour or other substance to be dried, passes.

To enable others, skilled in the art to make and use our invention, we will proceed to describe its construction and operation. The material we use in its construction is metal.

Figure I in the accompanying drawing represents in perspective the machine entire. A, represents the cylindrical segment, of any length and any chord, closed by a cap at D, and closed also at the other end in the same manner, except a passage for steam. The chord of the segment is closed by a plane, as shown at H, Fig. II, with flanges or guards on both sides and one end, of sufficient elevation to retain the flour or other substance to be dried in its passage along the plane from $a$ to $c$, Figs. I and II. The flanges are represented by B in Figs. I, II and III. The plane may be constructed toward $c$, as in Fig. II.

Fig. II represents, but not in perspective, the plane.

Fig. *iii* represents, but not in perspective, a cross section of the machine at G, Fig. I.

The flour or other substance to be dried is let on to the plane at $a$, Figs. I and II, that end of the plane being sufficiently elevated above the other to cause the substance dried to pass off by gravity at $c$, Fig. II, which projects beyond the segment, as in Fig. I. The steam may be obtained in any known manner and is let into the closed segment at a hole perforated for that purpose at or near G, Figs. I and III, on the under side and at or near the more depressed end of the machine, and passes off at F through pipe E. Pipe E is shown in Figs. I and II and is firmly attached to the more elevated end of the segment and machine as there represented.

What we claim as our invention and wish to secure by Letters Patent is—

The use, for the drying of flour and other finely divided substances, of a cylindrical segment, of any length and any chord, closed at the ends by caps, and along the chord by a plane, except a passage through the closed segment for the drying agent, as herein described, the drying agent being applied with scribed, the drying agent being applied within the closed segment, under the plane, and the flour or other substance to be dried passing along the plane.

JOHN BALLANTINE.
    ADAM CLARK.

Witnesses:
 A. PETERS,
 THOS. POTTER.